US011383785B2

(12) United States Patent
Choi et al.

(10) Patent No.: US 11,383,785 B2
(45) Date of Patent: Jul. 12, 2022

(54) TILTING STRUCTURE OF MOBILITY DEVICE AND MOBILITY DEVICE INCLUDING THE SAME

(71) Applicants: HYUNDAI MOTOR COMPANY, Seoul (KR); KIA MOTORS CORPORATION, Seoul (KR)

(72) Inventors: Jung Nam Choi, Seongnam-si (KR); Sung Dae Lim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 189 days.

(21) Appl. No.: 16/898,854

(22) Filed: Jun. 11, 2020

(65) Prior Publication Data
US 2021/0001946 A1 Jan. 7, 2021

(30) Foreign Application Priority Data
Jul. 3, 2019 (KR) .......................... 10-2019-0079901

(51) Int. Cl.
| | |
|---|---|
| *B62K 5/10* | (2013.01) |
| *B62K 5/08* | (2006.01) |
| *B62K 21/12* | (2006.01) |
| *B62K 21/08* | (2006.01) |
| *B62K 5/00* | (2013.01) |

(52) U.S. Cl.
CPC .................. *B62K 5/10* (2013.01); *B62K 5/08* (2013.01); *B62K 21/08* (2013.01); *B62K 21/12* (2013.01); *B62K 2005/001* (2013.01)

(58) Field of Classification Search
CPC . B62K 5/10; B62K 5/08; B62K 21/08; B62K 21/12; B62K 2005/001; B62K 5/01; B60G 2200/144; B60G 2200/44; B60G 3/20; B60G 2300/122; B60G 2300/45; B62D 9/04; B62D 7/20; B62D 7/18; B62D 7/22
See application file for complete search history.

(56) References Cited

U.S. PATENT DOCUMENTS 6,203,043 B1 * 3/2001 Lehman .................. B62K 5/00
280/282
8,070,172 B1 * 12/2011 Smith ...................... B62K 5/05
280/124.135

(Continued)

*Primary Examiner* — Darlene P Condra
(74) *Attorney, Agent, or Firm* — McDonnell Boehnen Hulbert & Berghoff LLP

(57) ABSTRACT

Disclosed is a tilting structure of a mobility device, the tilting structure including: a base frame; a tilting bar coupled to the base frame to be able to rotate in two side directions on a rotational center fixed to the base frame; front wheels having a rotary shaft fixed to steering knuckles vertically extending; first connection links each having a first end rotatably coupled to the steering knuckle and a second end rotatably coupled to the base frame; second connection links each having a first end rotatably coupled to the steering knuckle at a position spaced over or under the coupling position of the first connection link and a second end rotatably coupled at a position spaced apart from the rotational center of the tilting bar; and shock-absorbing members each having a first end fixed to the base frame and a second end connected to the steering knuckle, the first connection link, or the second connection link.

11 Claims, 11 Drawing Sheets

(56) References Cited

U.S. PATENT DOCUMENTS

| | | | |
|---|---|---|---|
| 9,387,902 B2* | 7/2016 | Kroening, Jr. | B62K 5/027 |
| 2011/0006498 A1* | 1/2011 | Mercier | B60G 21/00 |
| | | | 280/124.103 |
| 2011/0215544 A1* | 9/2011 | Rhodig | B60G 21/00 |
| | | | 280/124.103 |
| 2012/0232758 A1* | 9/2012 | Mercier | B60G 17/0162 |
| | | | 701/41 |
| 2015/0259027 A1* | 9/2015 | Takano | B62K 21/02 |
| | | | 280/267 |
| 2019/0144035 A1* | 5/2019 | Doerksen | B60G 17/0162 |
| | | | 280/124.103 |
| 2019/0291523 A1* | 9/2019 | Yoshida | B60G 7/005 |
| 2020/0102037 A1* | 4/2020 | Hirayama | B62K 5/10 |

* cited by examiner

TILTING STRUCTURE OF MOBILITY DEVICE AND MOBILITY DEVICE INCLUDING THE SAME

CROSS REFERENCE TO RELATED APPLICATIONS

This application claims the priority benefit of Korean Patent Application No. 10-2019-0079901, filed on Jul. 3, 2019 in the Korean Intellectual Property Office, the disclosure of which is incorporated herein by reference.

BACKGROUND

1. Field

The present disclosure relates to a tilting structure of a mobility device and a mobility device including the same and, more particularly, to a structure that tilts a mobility device through a simple operation by a driver.

2. Description of the Prior Art

Recently, interest in a single personal mobility device has increased, and accordingly, interest in 3-wheel or 4-wheel vehicles or bikes has increased. In particular, transportation has been released in various types including a type in which a passenger drives by pedaling in person and a type that drives using fossil fuel energy or electrical energy.

Such transportations have a light vehicle body and a high center of gravity, so roll-over easily occurs when turning. Accordingly, there is a need for a structure that can not only steer, but tilt wheels to improve driving stability.

Vehicles include a device that tilts wheels by operating a separate actuator when turning, but the structure is complicated so the weight and the manufacturing cost are increased. Accordingly, the device is difficult to apply to a personal mobility device.

The description provided above as a related art of the present disclosure is just for helping understanding the background of the present disclosure and should not be construed as being included in the related art known by those skilled in the art.

SUMMARY

The present disclosure is proposed to solve the problems described above and an aspect of the present disclosure is to provide a structure that tilts a mobility device through an operation by a driver using a simple structure without including a separate actuator.

In view of the foregoing, a tilting structure of a mobility device according to the present disclosure includes: a base frame; a tilting bar coupled to the base frame to be able to rotate in two side directions on a rotational center fixed to the base frame; front wheels having a rotary shaft fixed to steering knuckles vertically extending; first connection links each having a first end rotatably coupled to the steering knuckle and a second end rotatably coupled to the base frame; second connection links each having a first end rotatably coupled to the steering knuckle at a position spaced over or under the coupling position of the first connection link and a second end rotatably coupled at a position spaced apart from the rotational center of the tilting bar; and shock-absorbing members each having a first end fixed to the base frame and a second end connected to the steering knuckle, the first connection link, or the second connection link.

The front wheels, the first connection links, the second connection links, and the shock-absorbing members may be disposed at both sides of the base frame, and the tilting structure may further include an extension link that has both ends extending in two side directions and rotatably coupled to the second connection links, respectively, and is rotatably coupled to the tilting bar at a middle portion thereof.

The tilting structure may further include guide links each having a first end rotatably coupled to the base frame and a second end rotatably coupled at the joint between the extension link and the second connection link, and guiding a joint between the extension link and the second connection link by rotating on the first end.

A lower end of the tilting bar may be rotatably coupled to the base frame, and the first end of the second connection link may be connected to the upper end of the steering knuckle and the second end of the second connection link may be spaced upward apart from the rotational center of the tilting bar.

The first end of the first connection link may be connected to a lower end of the steering knuckle and the second end of the shock-absorbing member may be coupled to a lower end of the first connection link or the steering knuckle.

The first end of the shock-absorbing member may be coupled to the tilting bar at a position vertically spaced apart from a joint between the second connection link and the tilting bar.

The tilting structure may further include rotary links connecting the steering knuckles, the first connection links, or the second connection links to the second ends of the shock-absorbing members, and rotatably coupled to the base frame.

The tilting bar may extend upward and bend rearward, and the tilting structure may further include a steering bar extending in parallel with the tilting bar, coupled to rotate relative to the tilting bar about an extension direction of the tilting bar, and connected to the steering knuckle to rotate the steering knuckle in a yaw direction by rotating relative to the tilting bar.

A steering handle extending in a plane perpendicular to the extension direction of the steering bar may be disposed at an upper end of the steering bar.

The tilting bar may be formed in a hollow link shape having a space therein and the steering bar may be inserted in the tilting bar to be able to relatively rotate.

The steering bar may have a coupling pin protruding from the surface of the steering bar and extending outward through the tilting bar and a through-hole through which the coupling pin is disposed may be formed at the tilting bar and may extend along a movement path of the coupling pin that is formed by relative rotation of the steering bar.

The shock-absorbing member may be a spring or a shock absorber.

In order to achieve the aspects, a mobility device according to the present disclosure is a mobility device including the tilting structure of a mobility device according to the present disclosure and may further include a driving force provider that drives front wheels or rear wheels using a driving force generated by a driving source or a driving force provided from a passenger.

According to the tilting structure of a mobility device of the present disclosure, there is an effect that an intuitive tilting effect is achieved through only a simple structure without an actuator.

Further, the tilting structure is integrated with a suspension of a mobility device without interference, so there is an effect that the suspension can normally operate in a tilted state.

Further, the tilting structure has an effect that it is possible to control tilting separately from steering while having a structure integrated with a steering system.

BRIEF DESCRIPTION OF THE FIGURES

The above and other aspects, features and advantages of the present disclosure will be more apparent from the following detailed description taken in conjunction with the accompanying drawings, in which.

DETAILED DESCRIPTION

Figure 1:
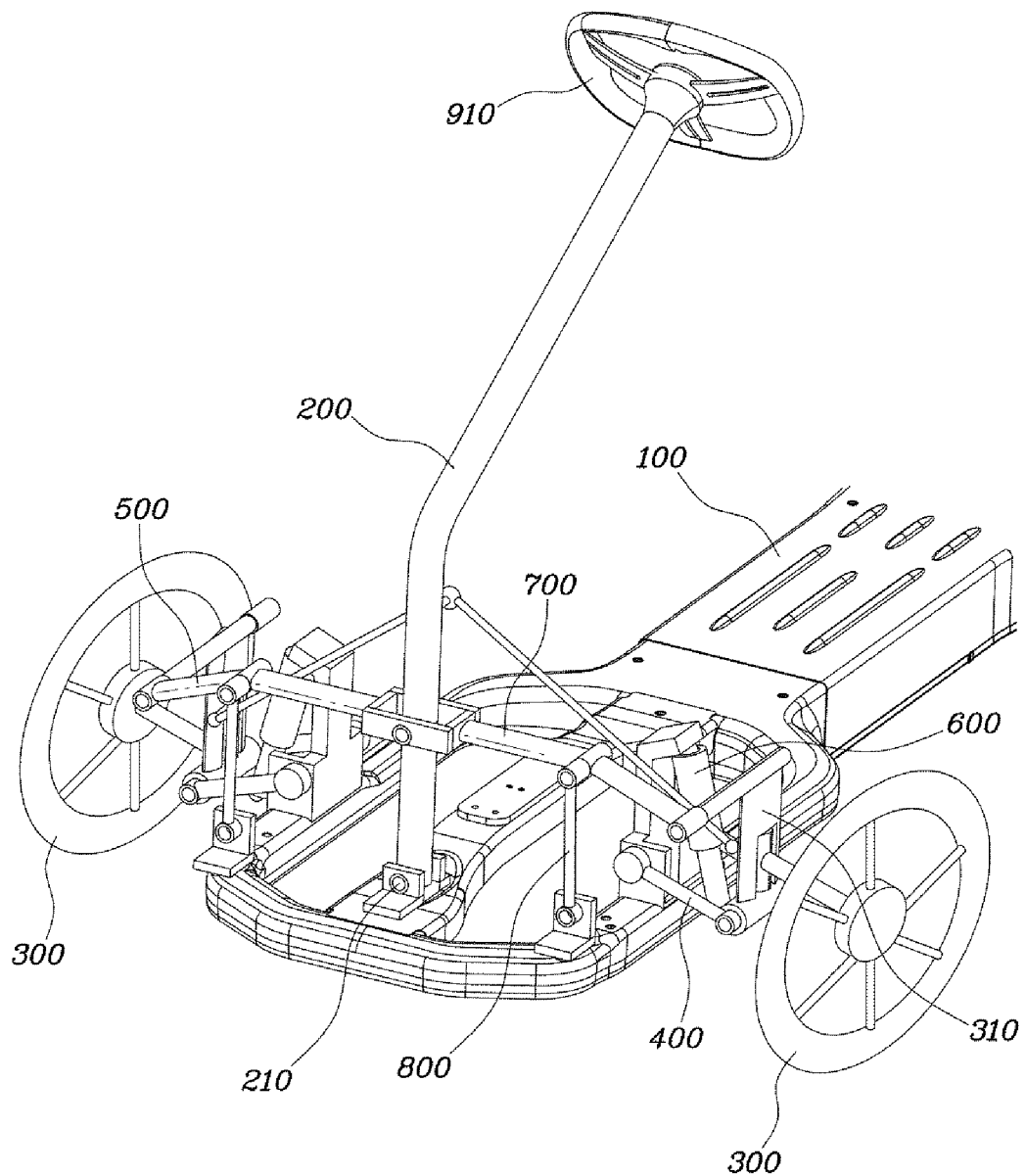
FIG. 1 is a perspective view of a mobility device according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

In the present specification, the terms are merely used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, a preferred embodiment of the present disclosure will be described in detail with reference to the accompanying drawings. Similar reference numerals presented in the drawings denote similar elements.

Figure 2:
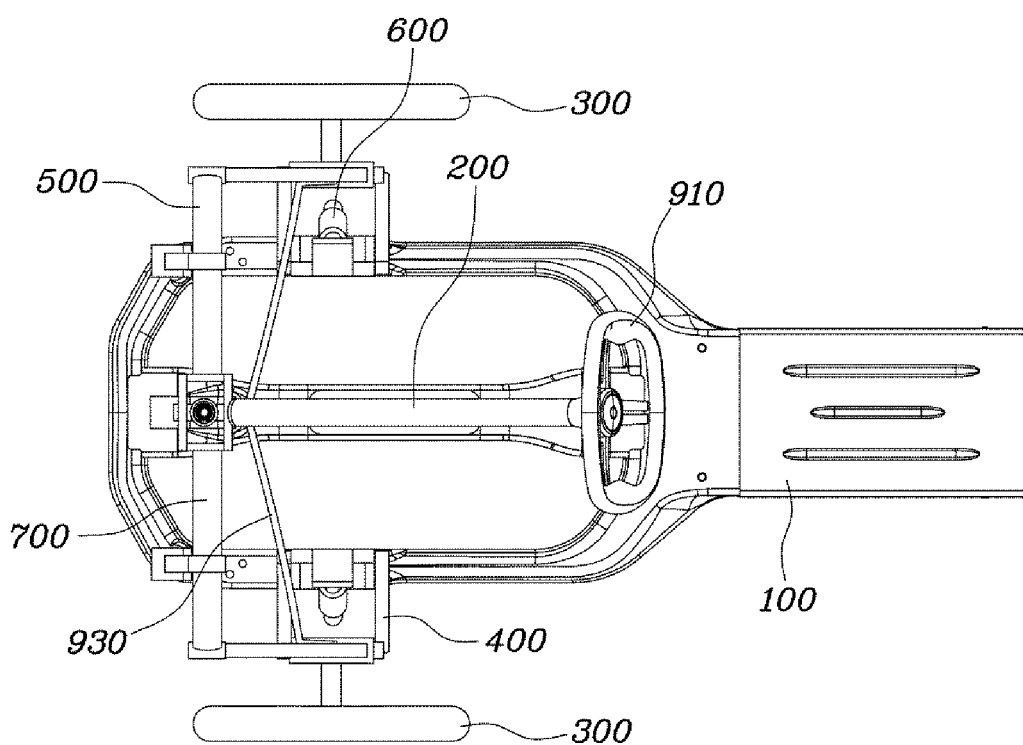
FIG. 2 is a top view of the mobility device according to an embodiment of the present disclosure.
Figure 3:
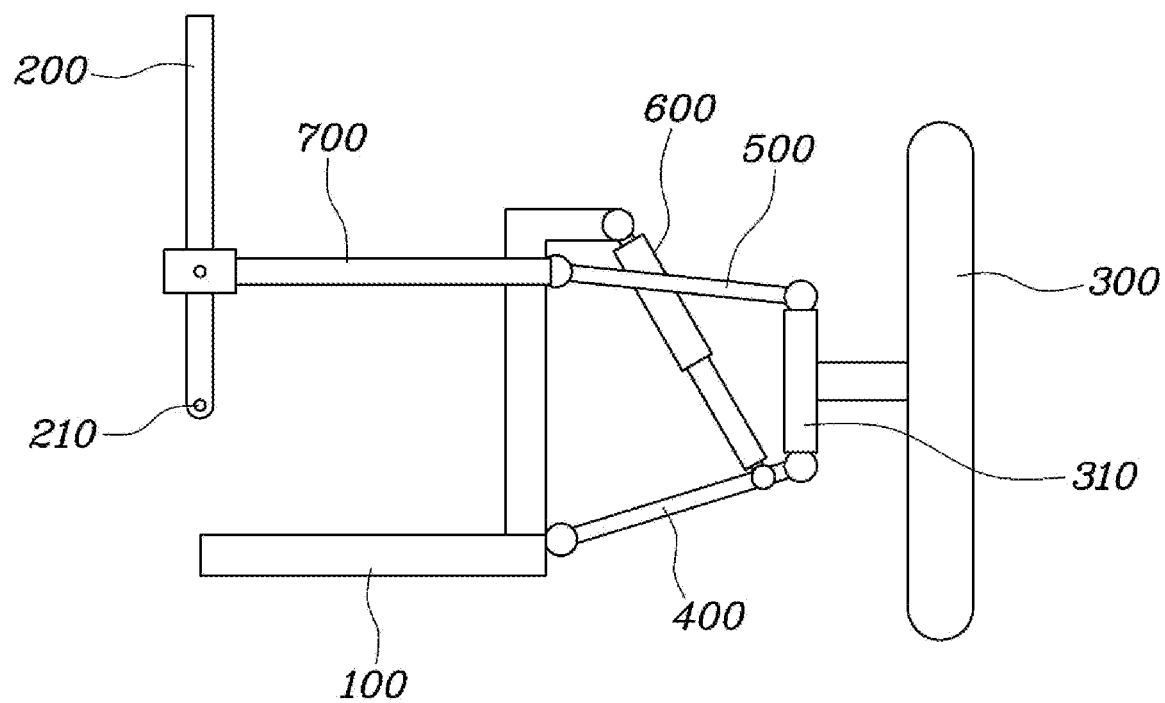
FIG. 3 is a view showing a tilting structure of the mobility device according to an embodiment of the present disclosure.

FIG. 1 is a perspective view of a mobility device according to an embodiment of the present disclosure, FIG. 2 is a top view of the mobility device according to an embodiment of the present disclosure, and FIG. 3 is a view showing a tilting structure of the mobility device according to an embodiment of the present disclosure.

Referring to FIGS. 1 to 3, a tilting structure of a mobility device according to an embodiment of the present disclosure includes a base frame 100, a tilting bar 200 coupled to the base frame 100 to be able to rotate in two side directions on a rotational center 210 fixed to the frame 100, front wheels 300 each having a rotary shaft fixed to a vertically extending steering knuckle 310, a plurality of first connection links 400 each having a first end rotatably coupled to the steering knuckle 310 and a second end rotatably coupled to the base frame 100, a plurality of second connection links 500 each having a first end rotatably coupled to the steering knuckle 310 at a position spaced over or under the coupling position of the first connection link 400 and a second end rotatably coupled at a position spaced apart from the rotational center 210 of the tilting bar 200, and a plurality of shock-absorbing members 600 each having a first end fixed to the base frame 100 and a second end connected to either the steering knuckle 310, each of the first connection links 400, or each of the second connection links 500. It should be understood that when describing the structure or function of one of the above elements, the same structure and function applies to the rest of the plurality of the elements.

The base frame 100 may extend in a plane that is parallel with the ground. A space in which a driver or a passenger can sit may be provided at the base frame 100 and a driving force provider (not shown) to be described below may be mounted on the base frame 100.

The tilting bar 200 may be coupled to the base frame 100 to be able to rotate in two side directions on the rotational center 210 fixed to the base frame 100. For example, the lower end of the tilting bar 200 may be rotatably coupled to the base frame 100 or, the rotational center 210 may be disposed between the upper end and the lower end of the tilting bar 200, so the upper end and the lower end can be rotated in the opposite directions by rotation of the tilting bar 200.

Front wheels 300 or rear wheels (not shown) may be included in the base frame 100. It is assumed in the embodiment that steering and tilting are applied to the front wheels 300. Rear wheels (not shown) can be applied in the same way.

The rotary shaft of each of the front wheels 300 is fixed to the steering knuckle 310 vertically extending. The front wheel 300 may be supplied with a driving force from the driving force provider (not shown) to be described above to rotate with the rotary shaft.

The first ends of the first connection links 400 and the second connection links 500 may be coupled to the steering knuckles 310. In particular, the first end of the first connection link 400 and the first end of the second connection link 500 may be vertically spaced apart from each other and coupled to the steering knuckle 310.

The second end of the first connection link 400 may be rotatably coupled to the base frame 100. That is, the first connection link 400 can connect the steering knuckle 310 and the base frame 100 to each other.

The second end of the second connection link 500 may be coupled to the tilting bar 200. In particular, the second end of the second connection link 500 may be coupled at a position spaced part from the rotational center 210 where the tilting bar 200 is rotatably coupled to the base frame 100.

Accordingly, when the tilting bar 200 is laterally rotated from the rotational center 210, the second end of the second connection link 500 laterally slides, so the steering knuckle 310 and the front wheel 300 can be laterally tilted. Accordingly, there is an effect that a driver tilts the front wheels 300 by operating the tilting bars 200 through a simple structure, thereby being able to improve driving stability.

The first end of the shock-absorbing member 600 may be fixed to the base frame 100 and the second end thereof may be connected to the steering knuckle 310, the first connection link 400, or the second connection link 500.

For example, the shock-absorbing member 600 may be coupled to the first connection link 400 positioned relatively low or may be coupled to the lower end of the steering knuckle 310. Accordingly, the weight of the base frame 100 can be stably supported by the front wheels 300.

The shock-absorbing member 600 may be a spring or a shock absorber. Accordingly, it is possible to attenuate shock due to movement of the front wheel 300 that is transmitted by the ground.

The front wheels 300, the first connection links 400, the second connection links 500, and the shock-absorbing members 600 are disposed at both sides of the base frame 100, and the tilting structure may further include an extension link 700 that has both ends extending in two side directions and rotatably coupled to the second connection links 500, respectively, and is rotatably coupled to the tilting bar 200 at the middle portion.

The front wheels 300 may be disposed at both sides of the base frame 100, and the first connection link 400, the second connection link 500, and the shock-absorbing member 600 may be connected to each of the front wheels 300.

As shown in FIGS. 1 to 3, in the embodiment, the extension link 700 extends to both sides from the tilting bar 200 with the middle portion thereof rotatably coupled to the tilting bar 200, so both ends of the extension link 700 can be rotatably coupled to the second connection links 500, respectively.

Accordingly, the extension link 700 changes the rotation motion of the tilting bar 200 into a straight motion and transmits the straight motion to the second connection links 500, so there is an effect that a smooth motion of the second connection links 500 is achieved.

The tilting structure may further include guide links 800 each having a first end rotatably coupled to the base frame 100 and a second end rotatably coupled at the joint between the extension link 700 and the second connection link 500, and guiding the joint between the extension link 700 and the second connection link 500 by rotating on the first end.

The guide link 800 is rotated with the first end fixed to the base frame 100 and the second end thereof may be coupled at the joint between the extension link 700 and the second connection link 500 to be able to simultaneously rotate.

When the tilting bar 200 is rotated by the guide link 800, the movement path of the second end of the guide link 800 can be guided.

In another embodiment, the second end of the guide link 800 may be coupled to the extension link 700 at a position spaced apart from the joint between the extension link 700 and the second connection link 500.

Figure 4:
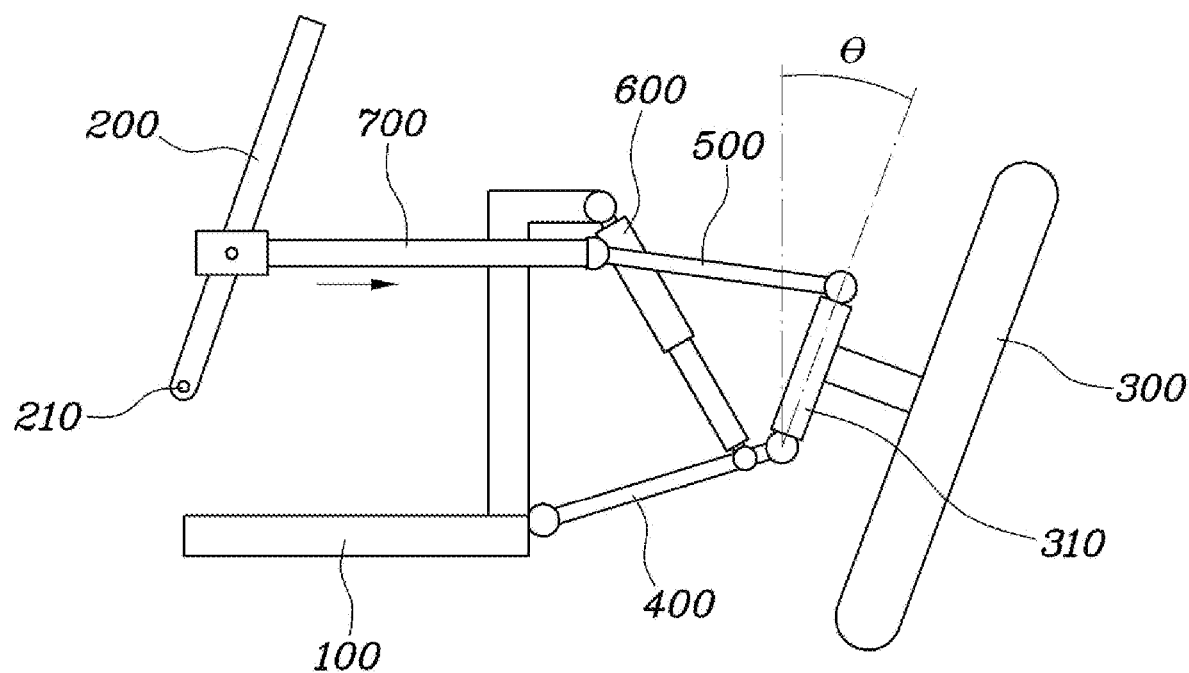
FIGS. 4 and 5 are views showing a modified state of the tilting structure of the mobility device according to an embodiment of the present disclosure.
Figure 5:
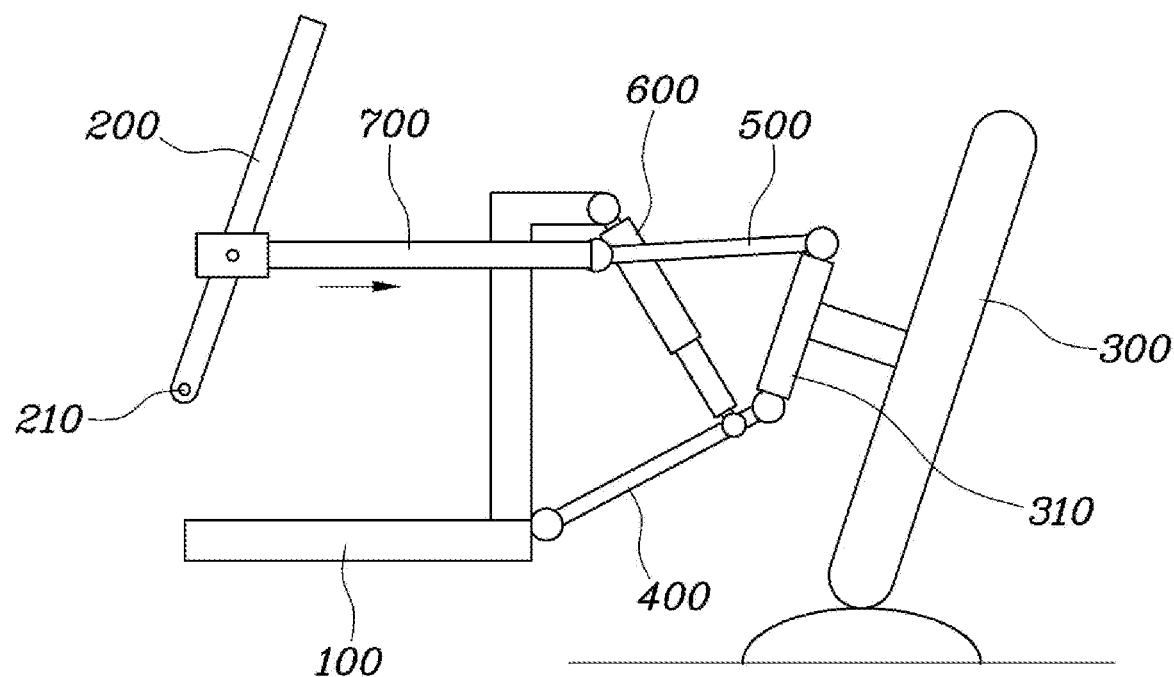

FIGS. 4 and 5 are views showing a modified state of the tilting structure of the mobility device according to an embodiment of the present disclosure.

Referring to FIGS. 4 and 5, FIG. 4 shows the state in which the front wheel 300 has been tilted by rotation of the tilting bar 200 and FIG. 5 shows the state in which the front wheel 300 has been vertically moved by an obstacle in a tilted state.

The lower end of the tilting bar 200 is rotatably coupled to the base frame 100, and the first end of the second connection link 500 may be connected to the upper end of the steering knuckle 310 and the second end may be spaced upward apart from the rotational center 210 of the tilting bar 200.

The rotational center 210 of the tilting bar 200 is positioned at the lower end of the tilting bar 200 and the second end of the second connection link 500 is coupled to a portion over the rotational center 210, so the rotational direction of the tilting bar 200 that is laterally rotated by a driver and the movement direction of the second connection link 500 may be the same. Accordingly, intuitive tilting control is possible.

The first end of the first connection link 400 may be connected to the lower end of the steering knuckle 310 and the second end of the shock-absorbing member 600 may be coupled to the lower end of the first connection link 400 or the steering knuckle 310.

The first connection link 400 can connect the lower end of the steering knuckle 310 and the base frame 100 to each other and the shock-absorbing member 600 is coupled to the lower end of the first connection link 400 or the steering knuckle 310, so the weight of the base frame 100 can be stably supported by the front wheels 300.

Figure 6:
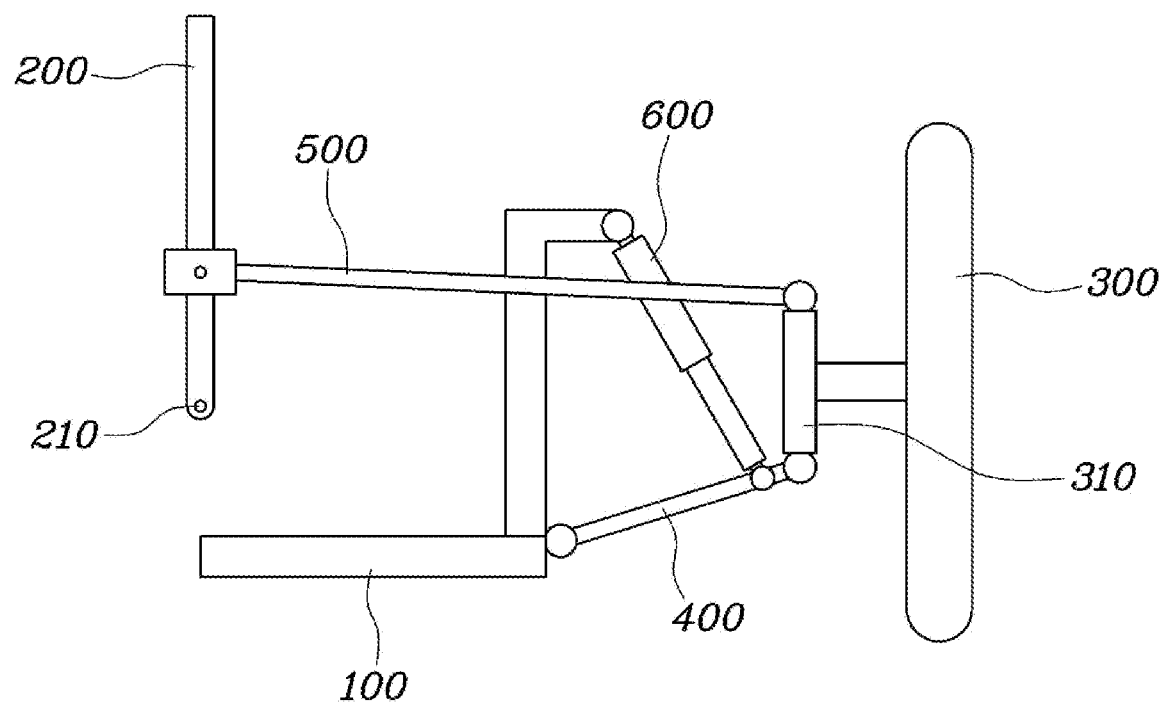
FIGS. 6 and 7 are views showing a tilting structure of a mobility device according to another embodiment of the present disclosure.
Figure 7:
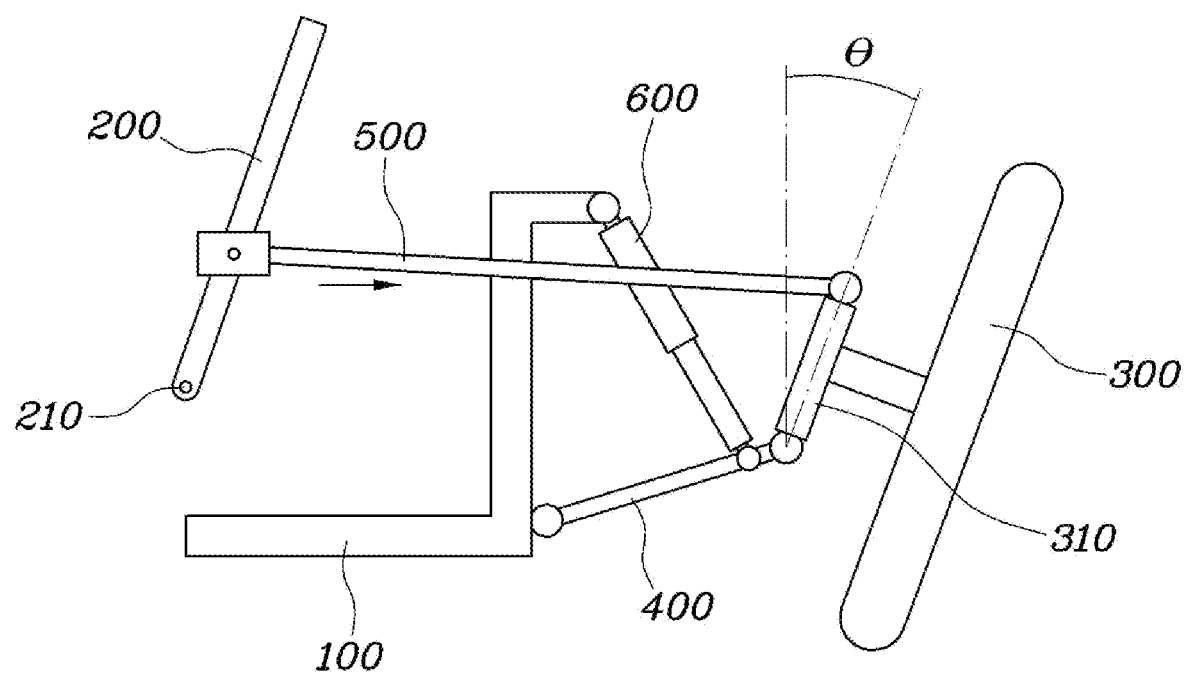

FIGS. 6 and 7 are views showing a tilting structure of a mobility device according to another embodiment of the present disclosure.

Referring to FIGS. 6 and 7, a tilting structure of a mobility device according to another embodiment of the present disclosure may have a structure in which the second connection link 500 is directly connected to the tilting bar 200 without including the extension link 700 extending in two side direction from the tilting bar 200.

Accordingly, there is an effect that it is possible to reduce the number of parts and tilt the front wheels 300 through a simple structure.

Figure 8:
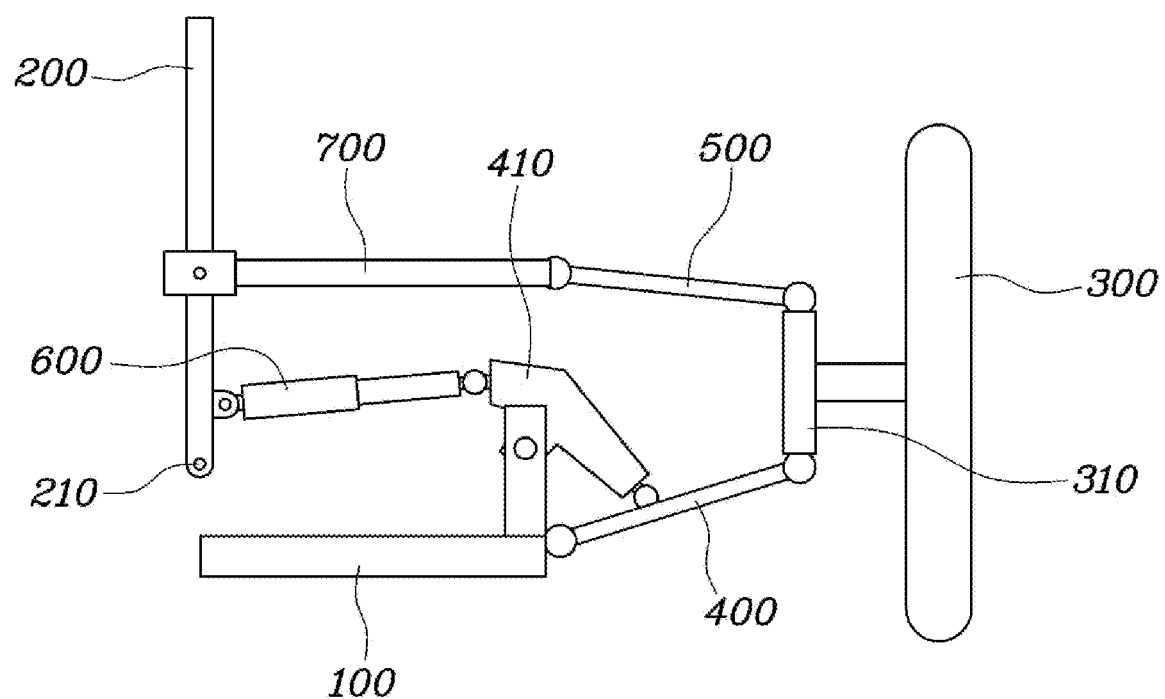
FIGS. 8 and 9 are views showing a tilting structure of a mobility device according to another embodiment of the present disclosure.
Figure 9:
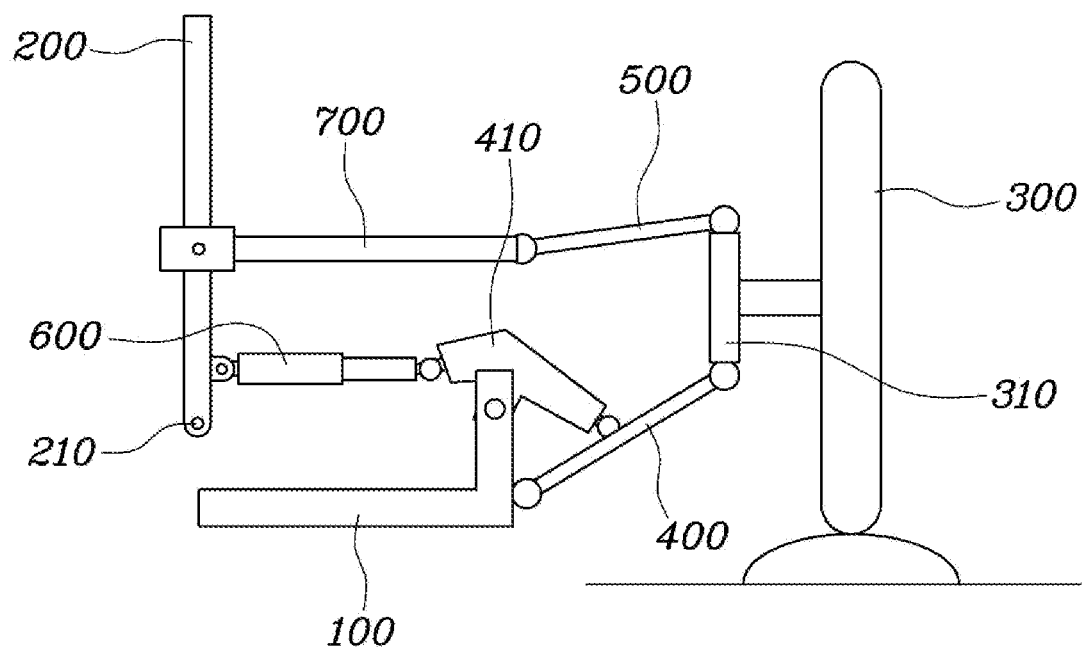

FIGS. 8 and 9 are views showing a tilting structure of a mobility device according to another embodiment of the present disclosure.

Referring to FIGS. 8 and 9, the first end of the shock-absorbing member 600 may be coupled to the tilting bar 200 at a position vertically spaced apart from the joint between the second connection link 500 and the tilting bar 200.

The shock-absorbing member 600 may be directly coupled and fixed to the base frame 100, as in the above embodiments, but it may be coupled to the base frame 100 through the tilting bar 200, as in this embodiment. In particular, the shock-absorbing member 600 may be coupled at a position spaced apart from the rotational center 210 of the tilting bar 200 and the second end of the second connection link 500.

That is, the first end of the shock-absorbing member 600 may be rotatably coupled to the tilting bar 200 to operate with rotation of the tilting bar 200.

The tilting structure may further include rotary links 410 connecting the steering knuckles 310, the first connection links 400, or the second connection links 500 to the second ends of the shock-absorbing members 600, and rotatably coupled to the base frame 100.

The rotary link 410 rotatably coupled at three points, in which one point may be rotatably coupled to the base frame 100, one point may be rotatably coupled to the second end of the shock-absorbing member 600, and the other one point may be rotatably coupled to the steering knuckle 310, the first connection link 400, or the second connection link 500.

In particular, the rotary link 410 is coupled to the lower end of the steering knuckle 310 or the first connection link 400, thereby being able to support the base frame 100.

The rotary link 410, for example, may be a cantilever link and rotates about the base frame 100 so that shock due to vertical displacement of the ground is attenuated and transmitted through the shock-absorbing member 600.

Figure 10:
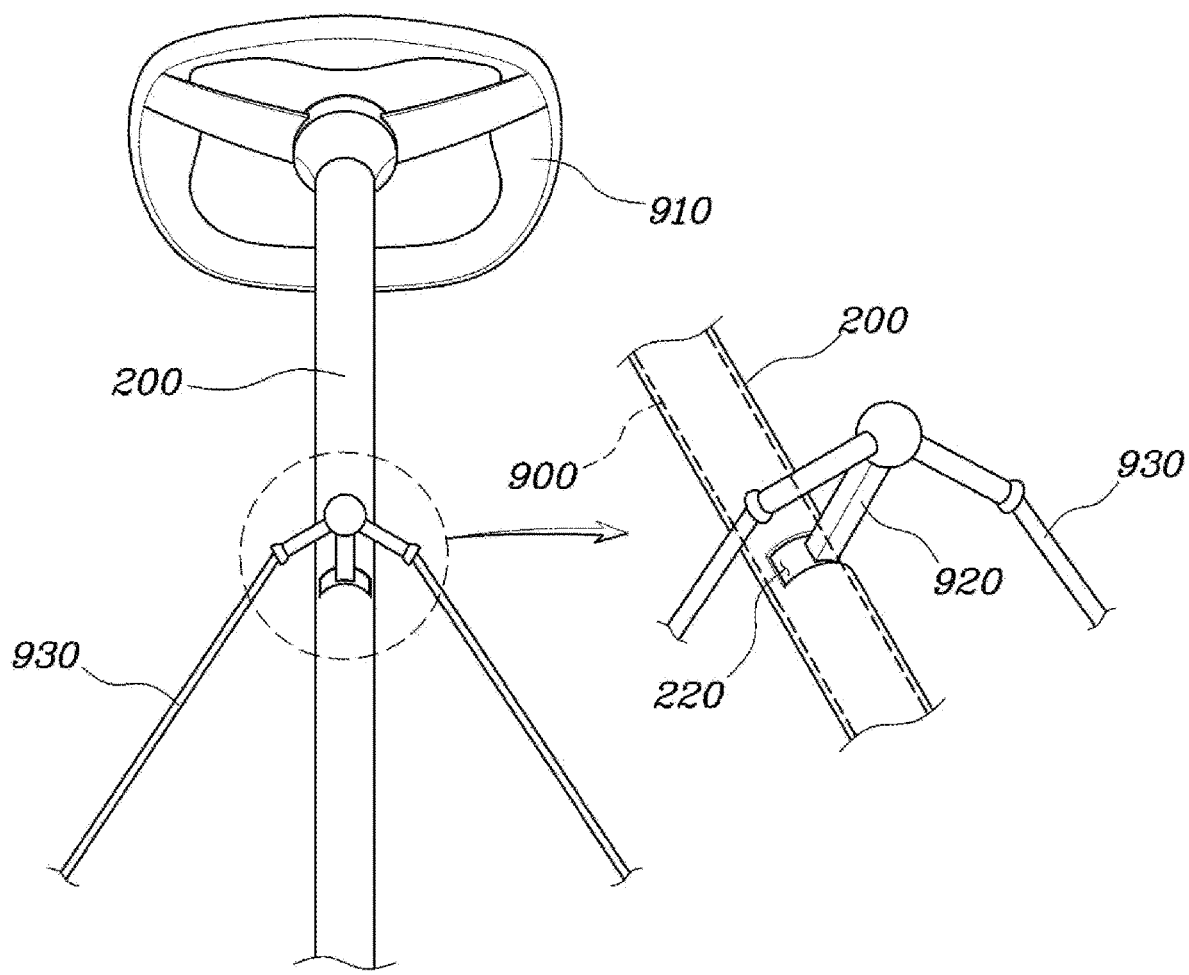
FIGS. 10 and 11 are views showing combination between a tilting structure of a mobility device according to an embodiment of the present disclosure and a steering bar.
Figure 11:
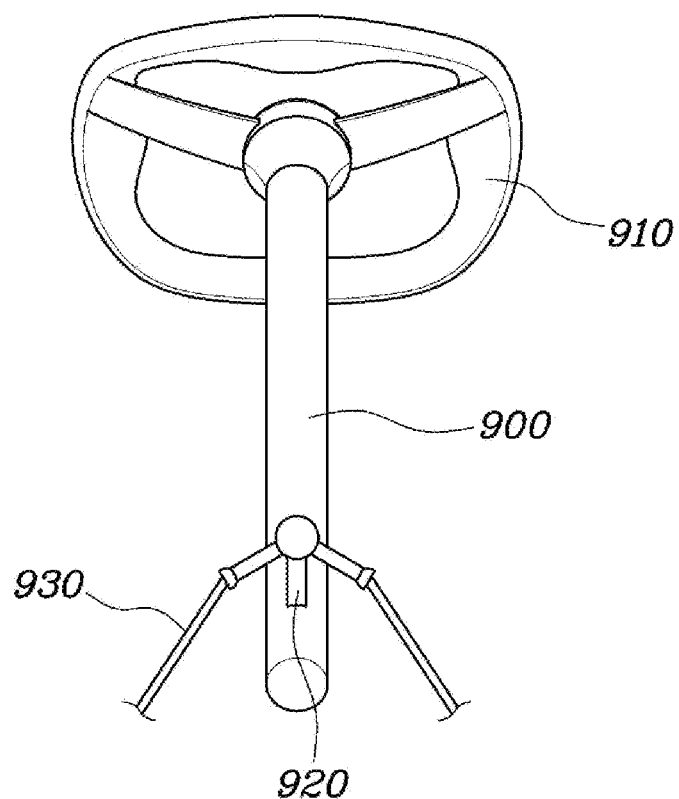

FIGS. 10 and 11 are views showing combination between a tilting structure of a mobility device according to an embodiment of the present disclosure and a steering bar 900.

Referring to FIGS. 10 and 11, the tilting bar 200 extends upward and bends rearward and the tilting structure may further include a steering bar 900 extending in parallel with the tilting bar 200, coupled to rotate relative to the tilting bar 200 about the extension direction of the tilting bar 200, and connected to the steering knuckle 310 to rotate the steering knuckle 310 in a yaw direction by rotating relative to the tilting bar 200.

The tilting bar 200 may have a shape extending upward from the base frame 100 and bending rearward. Accordingly, there is an effect that a driver sitting behind the tilting bar 200 can easily operate the tilting bar 200.

The steering bar 900 may be integrally configured with the tilting bar 200 but may be controlled separately from the tilting bar 200. The steering bar 900 is coupled to be able to rotate relative to the tilting bar 200, thereby being able to steer the front wheels 300.

In particular, the steering bar 900 can rotate relative to the tilting bar 200 about the extension direction of the steering bar 900 or the tilting bar 200 and can rotate the steering knuckles 310 and the front wheels 300 in the yaw direction by rotating relative to the tilting bar 200.

In an embodiment, steering links 930 are coupled to the steering bar 900, so when the steering links 930 can be laterally slid by rotation of the steering bar 900 and the steering link 930 is connected to the steering knuckles 310, thereby being able to laterally rotating the steering knuckles 310. The steering links 930 may be coupled to the steering knuckles 310 at positions laterally spaced apart from the rotary shafts of the front wheels 300.

In particular, a steering handle 910 extending in a plane perpendicular to the extension direction of the steering bar 900 may be disposed at the upper end of the steering bar 900. The steering handle 910 may have a circular shape extending in the plane perpendicular to the extension direction of the steering bar 900 or the tilting bar 200. Accordingly, there is an effect that a driver can easily turn the steering handle 910.

The tilting bar 200 is formed in a hollow link shape having a space therein and the steering bar 900 can be inserted in the tilting bar 200 to be able to relatively rotate.

That is, the tilting bar 200 and the steering bar 900 may be integrated such that a driver can perform tilting and steering simultaneously.

The steering bar 900 has a coupling pin 920 protruding from the surface of the steering bar 900 and extending outward through the tilting bar 200 and a through-hole 220 through which the coupling pin 920 is disposed is formed at the tilting bar 200 and may extend along the movement path of the coupling pin 920 that is formed by relative rotation of the steering bar 900.

The steering links 930 may be coupled to the coupling pin 920 exposed outside from the tilting bar 200.

The through-hole 220 may extend in the path along which the steering bar 900 passing through the tilting bar 200 moves by rotating relative to the tilting bar 200. The through-hole 200 may extend a length that is limited in correspondence to the maximum steering angle of the front wheels 300.

Referring to FIGS. 1 and 2 again, a mobility device including the tilting structure of a mobility device according to an embodiment of the present disclosure may further include a driving force provider (not shown) that drives the front wheels 300 or rear wheels (not shown) using a driving force generated by a driving source or a driving force provided from a passenger.

The mobility device according to an embodiment of the present disclosure may be a device to which a passenger directly provides a driving force through a pedal, etc., or a device that is driven by a driving force generated by a driving source such as a motor. A battery that provides stored power to a driving source such as a motor may be further mounted on the base frame 100.

The rotary shafts of the front wheels 300 or the rear wheels (not shown) are connected to the driving force provider (not shown), whereby they can be provided with a driving force.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

The invention claimed is:

1. A tilting structure of a mobility device, comprising:
   a base frame;
   a tilting bar coupled to the base frame to be able to rotate in two side directions on a rotational center fixed to the base frame;
   a plurality of front wheels each having a rotary shaft fixed to a vertically extending steering knuckle;

a plurality of first connection links each having a first end rotatably coupled to the steering knuckle and a second end rotatably coupled to the base frame;

a plurality of second connection links each having a first end rotatably coupled to the steering knuckle at a position spaced over or under the coupling position of one of the plurality of first connection links and a second end rotatably coupled at a position spaced apart from the rotational center of the tilting bar;

a plurality of shock-absorbing members each having a first end fixed to the tilting bar and a second end connected to each of the steering knuckles, one of the plurality of first connection links, or one of the plurality of second connection links; and a plurality of rotary links connecting the steering knuckles, the first connection links, or the second connection links to the second ends of the shock-absorbing members, and rotatably coupled to the base frame.

2. The tilting structure of claim 1, wherein the front wheels, the plurality of first connection links, the plurality of second connection links, and the plurality of shock-absorbing members are disposed at both sides of the base frame, and the tilting structure further comprises an extension link that has both ends extending in two side directions and rotatably coupled to the plurality of second connection links, respectively, and is rotatably coupled to the tilting bar at a middle portion thereof.

3. The tilting structure of claim 2, further comprising a plurality of guide links each having a first end rotatably coupled to the base frame and a second end rotatably coupled at the joint between the extension link and each of the plurality of second connection links, and guiding a joint between the extension link and each of the plurality of second connection links by rotating on the first end.

4. The tilting structure of claim 1, wherein a lower end of the tilting bar is rotatably coupled to the base frame, and the first end of each of the plurality of second connection links is connected to the upper end of the steering knuckle and the second end of each of the second connection links is spaced upward apart from the rotational center of the tilting bar.

5. The tilting structure of claim 4, wherein the first end of each of the first connection links is connected to a lower end of the steering knuckle and the second end of each of the shock-absorbing members is coupled to a lower end of each of the first connection links or the steering knuckle.

6. The tilting structure of claim 1, wherein the tilting bar extends upward and bends rearward, and the tilting structure further comprises a steering bar extending in parallel with the tilting bar, coupled to rotate relative to the tilting bar about an extension direction of the tilting bar, and connected to the steering knuckle to rotate the steering knuckle in a yaw direction by rotating relative to the tilting bar.

7. The tilting structure of claim 6, wherein a steering handle extending in a plane perpendicular to the extension direction of the steering bar is disposed at an upper end of the steering bar.

8. The tilting structure of claim 6, wherein the tilting bar is formed in a hollow link shape having a space therein and the steering bar is inserted in the tilting bar to be able to relatively rotate.

9. The tilting structure of claim 8, wherein the steering bar has a coupling pin protruding from the surface of the steering bar and extending outward through the tilting bar and a through-hole through which the coupling pin is disposed is formed at the tilting bar and extends along a movement path of the coupling pin that is formed by relative rotation of the steering bar.

10. The tilting structure of claim 1, wherein the shock-absorbing member is a spring or a shock absorber.

11. A mobility device including the tilting structure of a mobility device comprising:

a base frame;

a tilting bar coupled to the base frame to be able to rotate in two side directions on a rotational center fixed to the base frame;

a plurality of front wheels each having a rotary shaft fixed to a vertically extending steering knuckle;

a plurality of first connection links each having a first end rotatably coupled to the steering knuckle and a second end rotatably coupled to the base frame;

a plurality of second connection links each having a first end rotatably coupled to the steering knuckle at a position spaced over or under the coupling position of one of the plurality of first connection links and a second end rotatably coupled at a position spaced apart from the rotational center of the tilting bar;

a plurality of shock-absorbing members each having a first end fixed to the tilting bar and a second end connected to the steering knuckle, one of the plurality of first connection links, or one of the plurality of second connection links; and a plurality of rotary links connecting the steering knuckles, the first connection links, or the second connection links to the second ends of the shock-absorbing members, and rotatably coupled to the base frame.

* * * * *